United States Patent [19]
Lebret et al.

[11] Patent Number: 5,226,701
[45] Date of Patent: Jul. 13, 1993

[54] AUTOMATIC BRAKING DEVICE FOR A VEHICLE

[75] Inventors: Pierre Lebret, Le Chesnay; Gilbert Kervagoret, Argenteuil, both of France

[73] Assignee: Bendix Europe Services Techniques, Drancy, France

[21] Appl. No.: 789,216

[22] Filed: Nov. 7, 1991

[30] Foreign Application Priority Data

Nov. 29, 1990 [FR] France ................... 90 14923

[51] Int. Cl.[5] ................................ B60T 8/34
[52] U.S. Cl. ..................... 303/113.2; 303/113.5; 303/115.2; 303/119.2
[58] Field of Search ..... 303/113 R, 113 TR, 113 AP, 303/115 R, 115 EC, 116 SP, 119 SV, 117, 113.1, 113.2, 113.5, 115.1, 115.2, 116.2, 119.2

[56] References Cited

U.S. PATENT DOCUMENTS

| | | | |
|---|---|---|---|
| 4,878,715 | 11/1989 | Toda | 303/113 TR |
| 4,915,459 | 4/1990 | Hashida et al. | 303/117 X |
| 4,944,565 | 7/1991 | Gilbert | 303/110 |
| 4,976,500 | 12/1990 | Cogswell, II et al. | 303/113 TR |
| 5,018,797 | 5/1991 | Takata | 303/119 SV |

FOREIGN PATENT DOCUMENTS

| | | |
|---|---|---|
| 0230213 | 7/1987 | European Pat. Off. . |
| 0347274 | 12/1989 | European Pat. Off. . |
| 0353125 | 1/1990 | European Pat. Off. . |
| 1555615 | 10/1970 | Fed. Rep. of Germany . |
| 2056606 | 3/1981 | United Kingdom ......... 303/119 SV |
| 2119883 | 11/1983 | United Kingdom . |

*Primary Examiner*—Robert J. Oberleitner
*Assistant Examiner*—Peter M. Poon
*Attorney, Agent, or Firm*—Larry J. Palguta; Ken C. Decker

[57] ABSTRACT

An automatic braking device for a vehicle equipped with at least one fluid circuit connecting a master cylinder (10) to a consumer circuit including at least one brake motor and possessing, furthermore, a pump (30) capable of delivering to the consumer circuit, via a non-return valve (31), fluid under high pressure taken from the master cylinder (10) comprises, in combination, a proportional solenoid valve connected to the consumer circuit and having a regulating outlet (20), during operation in the solenoid valve regulating the pressure of the fluid in the consumer circuit in relation to that of the fluid in the feed circuit of the pump, and a regulating slide (16) arranged between the master cylinder and the feed circuit of the pump in order to regulate the pressure of the fluid in the latter circuit and determine a reference pressure for the solenoid valve.

3 Claims, 1 Drawing Sheet

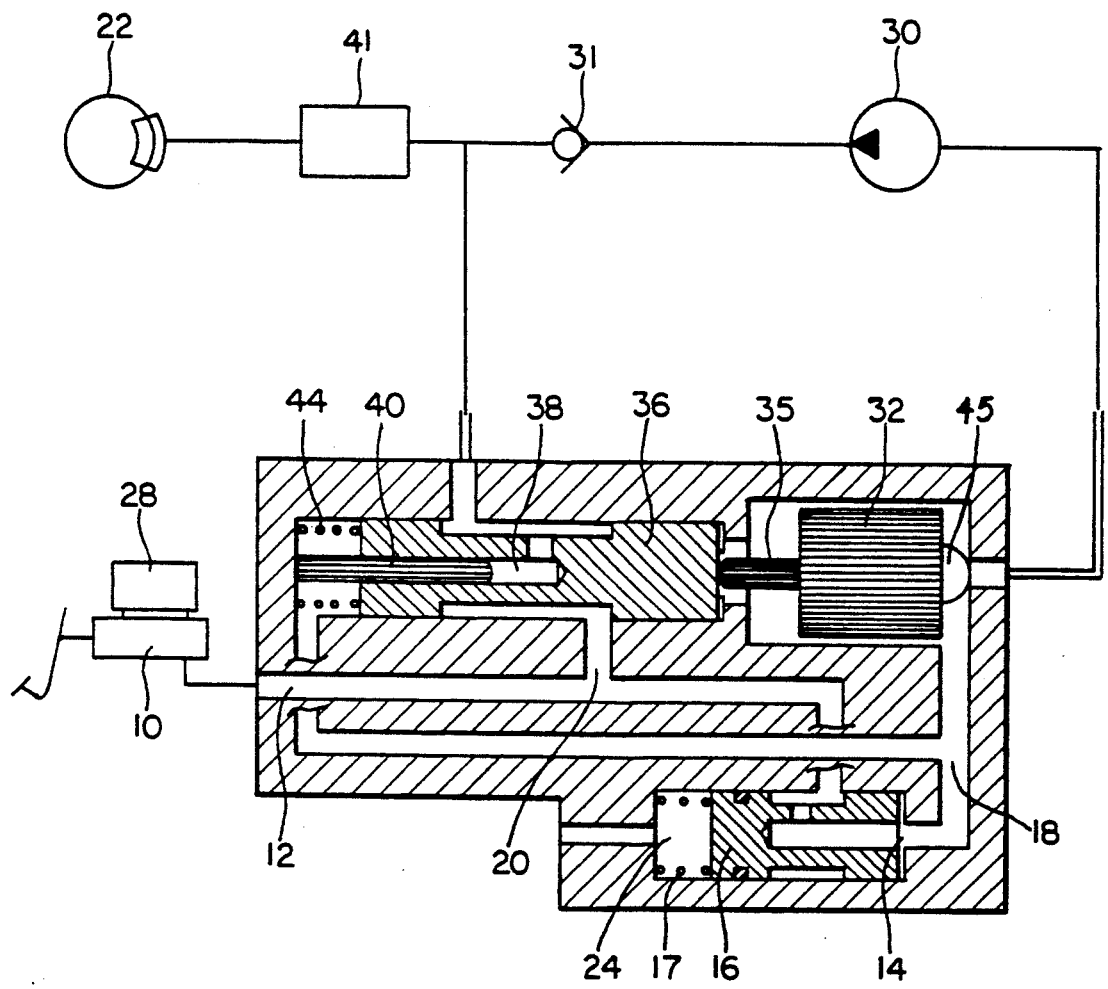

AUTOMATIC BRAKING DEVICE FOR A VEHICLE

BACKGROUND OF THE INVENTION

The present invention relates to an automatic braking device for a vehicle equipped with at least one fluid circuit connecting a master cylinder to a consumer circuit including at least one brake motor and possessing, furthermore, a pump capable of delivering to the brake motor fluid under high pressure taken from the master cylinder.

Such a device has many uses which an average person skilled in the art can easily combine. For example, it can be employed in a vehicle equipped with a wheel anti-lock system, for automatically commanding braking in response to a signal emitted by a marker or by a radar detecting an obstacle. It can also be employed for braking the driving wheels automatically when a skid is detected, especially during acceleration.

In all instances, for obvious safety reasons, the driver of the vehicle thus equipped must be able to brake his vehicle even if the device is in the automatic operating mode.

The document EP-A-0,230,213 describes a circuit allowing an automatic control of braking in the event that an obstacle is detected. However, this circuit does not make it possible to perform all the functions described above.

SUMMARY OF THE INVENTION

It is therefore an object of the invention to provide a device capable of performing all these functions.

According to the invention, the automatic braking device comprises, in combination, a proportional solenoid valve connected to the consumer circuit and having a regulating outlet, during operation this solenoid valve regulating the pressure of the fluid in the consumer circuit in relation to that of the fluid in the feed circuit of the pump, and a regulating slide valve arranged between the master cylinder and the feed circuit of the pump in order to regulate the pressure of the fluid in the latter circuit and determine a reference pressure for the solenoid valve.

BRIEF DESCRIPTION OF THE DRAWINGS

The invention will now be described by way of example with reference to the accompanying drawing in which:

the single FIGURE shows diagrammatically, in section, an automatic braking device according to the invention.

DETAILED DESCRIPTION OF THE INVENTION

Referring now to this single FIGURE, a master cylinder connected to a conduit 12 will be seen at 10. This conduit 12 is open onto a regulating slide valve 16 returned to rest by a spring 17, so as to allow open communication between this conduit 12 and a chamber 14, made on one side of the slide valve 16, and a conduit 18 forming part of the feed circuit of the pump 30. The chamber 24 made on the other side of the regulating slide valve 16 receives the atmospheric pressure. When this regulating slide valve 16 is displaced under the effect of the difference between the pressures prevailing in the chambers 14 and 24, it regulates the pressure of the fluid in the conduit 18 of the suction circuit of the pump.

In a known way, the pump 30 is capable of feeding fluid under high pressure to the brake motor 22 via a non-return valve 31. The feed inlet of the pump 30 is connected to the reservoir 28 by means of the conduits 12 and 18 and the master cylinder 10. This conduit 18 is likewise in communication with the two ends of the slide valve 36 of the solenoid valve, so as to determine a reference pressure for the proportional solenoid valve.

The solenoid valve comprises a core 32 subjected to a magnetic field intended for moving, by means of a push rod 35, the slide valve 36 returned to rest by a spring 44. A needle 40 immobile relative to the body of the assembly as a whole penetrates into a bore made in this slide valve 36 so as to determine a reaction chamber 38. This latter chamber 38 is permanently in communication with the consumer circuit comprising the anti-lock device 41 and the brake motor 22.

The core 32 has a shutter 45 for closing communication between the conduit 18 and the feed conduit of the pump 30 in the non-automatic operating mode. Such a shutter 45 is necessary only if the anti-lock device 41 makes use of the same pump 30. In this case, the feed conduit of the pump is also connected to a low-pressure reservoir (not shown in the FIGURE) via a non-return valve.

During normal braking, the pressure generated by the master cylinder is therefore repeated in the brake motor 22 since the slide valve 36 remains in the rest position and the solenoid valve is not energized. When a wheel lock is imminent, the anti-lock device 41 functions in the usual way.

Now during automatic operation, that is to say in response to an external command, since no pressure is generated by the master cylinder 10, the pump 30 and the solenoid valve are activated simultaneously. Communication between the feed inlet of the pump and the reservoir 28 is ensured by the shutter 45, then open, and by the regulating slide valve 16. The fluid sucked up by the pump 30 therefore remains at low pressure in the conduit 18. The regulating port of the solenoid valve is in communication with the reservoir 28 by way of the master cylinder 10, in the brake motor 22 in a controlled manner. The wheel anti-lock device 41 remains in operation in order to prevent any inopportune locking of the wheels.

If the driver wishes to brake his vehicle during the automatic braking time, a pressure is generated in the master cylinder 10. The regulating slide valve 16 then performs its function by regulating the pressure of the fluid sucked up by the pump 30 via the conduit 18 to a relatively low value which is essentially a function of the rigidity of the spring 17 and of the active hydraulic cross-section of the slide valve 16.

To attempt to regulate the pressure according to the instruction received, the port 20 then opens to a greater extent. The pressure generated by the master cylinder 10 is thus applied to the brake motor 22.

This device therefore makes it perfectly possible to perform the abovementioned functions in complete safety. In particular, it has the advantage compared to many known devices of allowing the vehicle to be braked during an anti-skid period, if the automatic operating mode is provided for preventing the skidding of the driving wheels and a progressive transfer, without pressure surges, between the automatic operating mode and the manual operating mode.

It will be appreciated that an average person skilled in the art can easily make modifications to this device, without departing from the scope of the invention, as defined by the accompanying claims.

What we claim is:

1. An automatic braking device for a vehicle, comprising a consumer circuit with at least one brake motor, a master cylinder, a pump capable of delivering fluid under high pressure taken from a feed circuit connected with the master cylinder, a fluid circuit connecting the master cylinder and the pump to the consumer circuit, a nonreturn valve through which the pump communicates the fluid under high pressure, and a solenoid valve arranged between the master cylinder and pump, wherein the solenoid valve is a proportional solenoid valve comprising a first regulating slide valve controlling an opening of a regulating port communicating the master cylinder with the consumer circuit, the proportional solenoid valve located between the feed circuit and pump and for regulating the pressure of the consumer circuit relative to the pressure of the feed circuit, the device further comprising in the feed circuit between the master cylinder and proportional solenoid valve a second regulating slide valve movable under the effect of pressure variation in the master cylinder in order to limit pressure in the feed circuit.

2. The device according to claim 1, wherein the pump and proportional solenoid valve are controlled simultaneously.

3. The device according to claim 1, wherein a reaction chamber is located in the first regulating slide valve, the reaction chamber connected permanently to the consumer circuit, the pressure of the feed circuit applied to both sides of the first regulating slide valve.

* * * * *